(12) United States Patent
James

(10) Patent No.: US 10,674,198 B2
(45) Date of Patent: Jun. 2, 2020

(54) SYSTEM FOR CONTROLLING ELECTRONIC DEVICES BY MEANS OF VOICE COMMANDS, MORE SPECIFICALLY A REMOTE CONTROL TO CONTROL A PLURALITY OF ELECTRONIC DEVICES BY MEANS OF VOICE COMMANDS

(71) Applicant: Saronikos Trading and Services, Unipessoal Lda, Funchal, Madeira (PT)

(72) Inventor: Robert James, Hatfield (GB)

(73) Assignee: Saronikos Trading and Services, Unipessoal LDA, Funchal, Madeira (PT)

( * ) Notice: Subject to any disclaimer, the term of this patent is extended or adjusted under 35 U.S.C. 154(b) by 0 days.

(21) Appl. No.: 14/910,000

(22) PCT Filed: Aug. 6, 2013

(86) PCT No.: PCT/EP2013/066505
§ 371 (c)(1),
(2) Date: Feb. 4, 2016

(87) PCT Pub. No.: WO2015/018440
PCT Pub. Date: Feb. 12, 2015

(65) Prior Publication Data
US 2016/0182938 A1 Jun. 23, 2016

(51) Int. Cl.
*G10L 21/00* (2013.01)
*G10L 25/00* (2013.01)
(Continued)

(52) U.S. Cl.
CPC ....... *H04N 21/42225* (2013.01); *G10L 15/22* (2013.01); *H04N 5/4403* (2013.01);
(Continued)

(58) Field of Classification Search
CPC ........... H04N 21/4856; H04N 21/4622; H04N 21/84; H04N 2005/44565;
(Continued)

(56) References Cited

U.S. PATENT DOCUMENTS 5,774,859 A 6/1998 Houser et al.
7,814,510 B1 * 10/2010 Ergen ..................... G08C 17/02
348/734
(Continued)

FOREIGN PATENT DOCUMENTS

CN 101815162 A 8/2010
EP 2 146 491 1/2010
(Continued)

OTHER PUBLICATIONS

International Search Report for Application No. PCT/EP2013/066505 dated Mar. 31, 2014.
(Continued)

*Primary Examiner* — Michael Ortiz-Sanchez
(74) *Attorney, Agent, or Firm* — Workman Nydegger

(57) ABSTRACT

A remote control for generating output signals apt at controlling one or more electronic device, characterized in that said remote control includes a sound transducer, a speech recognition unit for recognizing voice commands, a memory for storing information relative to available content of said one or more electronic device and a control signal generating and receiving unit for generating control signals corresponding to said voice commands, for controlling said one or more electronic device.

22 Claims, 2 Drawing Sheets

(51) Int. Cl.
*H04N 21/422* (2011.01)
*G10L 15/22* (2006.01)
*H04N 5/44* (2011.01)

(52) U.S. Cl.
CPC ... *H04N 21/4222* (2013.01); *H04N 21/42203* (2013.01); *G10L 2015/223* (2013.01); *H04N 2005/4408* (2013.01); *H04N 2005/4432* (2013.01)

(58) Field of Classification Search
CPC ......... H04N 21/42203; H04N 21/4126; H04N 21/4828; H04N 2005/4432; H04N 21/42222; H04N 21/42204; G10L 15/22; G10L 2015/223; G10L 15/30; G10L 2015/088; G10L 25/48; G10L 15/00; G10L 15/265; G10L 17/22; H04M 1/72533; H04M 11/007; G06F 3/167; G06F 17/289; G06F 9/4448; G06F 17/30849; G06F 17/30976
See application file for complete search history.

(56) References Cited

U.S. PATENT DOCUMENTS

| | | | | |
|---|---|---|---|---|
| 9,338,493 | B2* | 5/2016 | Van Os | G10L 15/22 |
| 2002/0071577 | A1* | 6/2002 | Lemay | H04N 5/44582 |
| | | | | 381/110 |
| 2004/0193426 | A1 | 9/2004 | Maddux et al. | |
| 2005/0216949 | A1* | 9/2005 | Candelora | H04N 21/2182 |
| | | | | 725/134 |
| 2006/0055582 | A1* | 3/2006 | Wendt | G08C 17/02 |
| | | | | 341/175 |
| 2007/0171091 | A1* | 7/2007 | Nisenboim | G08C 17/00 |
| | | | | 340/12.24 |
| 2009/0327892 | A1* | 12/2009 | Douillet | H04L 12/2812 |
| | | | | 715/717 |
| 2010/0009719 | A1* | 1/2010 | Oh | H04M 1/72583 |
| | | | | 455/563 |
| 2011/0119715 | A1 | 5/2011 | Chang et al. | |
| 2012/0030712 | A1* | 2/2012 | Chang | H04N 5/44543 |
| | | | | 725/52 |
| 2012/0215537 | A1 | 8/2012 | Igarashi | |
| 2013/0024197 | A1* | 1/2013 | Jang | G10L 15/22 |
| | | | | 704/246 |
| 2013/0041665 | A1* | 2/2013 | Jang | H04N 21/42203 |
| | | | | 704/246 |
| 2013/0072251 | A1* | 3/2013 | Kim | H04M 1/7253 |
| | | | | 455/550.1 |
| 2013/0073293 | A1* | 3/2013 | Jang | G10L 15/22 |
| | | | | 704/275 |
| 2014/0257788 | A1* | 9/2014 | Xiong | H04N 21/25816 |
| | | | | 704/8 |

FOREIGN PATENT DOCUMENTS

| | | |
|---|---|---|
| WO | WO 02/17625 | 2/2002 |
| WO | WO 2008/048825 | 4/2008 |
| WO | WO 2013/022135 | 2/2013 |

OTHER PUBLICATIONS

European Office Action dated Oct. 9, 2017, issued in European Application No. 13752863.4.
Chinese Office Action dated Jan. 29, 2018, issued in Chinese Application No. 201380078760.8.

* cited by examiner

SYSTEM FOR CONTROLLING ELECTRONIC DEVICES BY MEANS OF VOICE COMMANDS, MORE SPECIFICALLY A REMOTE CONTROL TO CONTROL A PLURALITY OF ELECTRONIC DEVICES BY MEANS OF VOICE COMMANDS

The present application claims priority from International Patent Application No. PCT/EP2013/066505 filed on Aug. 6, 2013, the disclosure of which is incorporated herein by reference in its entirety.

FIELD OF THE INVENTION

It is noted that citation or identification of any document in this application is not an admission that such document is available as prior art to the present invention.

The present invention relates to a system for controlling electronic devices by means of voice commands. More specifically the present invention relates to a remote control to control a plurality of electronic devices by means of voice commands.

As is known, remote controls are designed to generate control signals so as to control other electronic devices such as television apparatus, radios, audio systems, DVD players, set top boxes and the like. It is also known that with each of the above devices a specific remote control device is included in the packaging. This generates a proliferation of remote controls in the user's home. More recently, some of these remote controls require predetermined voice commands in order to operate, as a result of either directly receiving and processing voice commands or by sending voice commands to a corresponding device for speech recognition and generating control signals so as to control the electronic device.

The known solutions are subject to many disadvantages, such as the need for many remote controls, each being dedicated to a specific device. This causes an inconvenience for the user and complicates their use and increases the time necessary for finding the correct remote control. Consequently the costs for the user are also increased if a speech recognition unit has to be provided for each remote control of the electronic device. In addition pronouncing predetermined voice commands, established by the manufacturers for each individual device, thus increasing the number of user interactions, due to the increasing number of non-organized content, such as type of video, audio, TV channels, radio channels, Internet sources, photos, etc., in parallel with the increasing number of devices in a typical family that produces a lot of problems and many other inconveniences.

SUMMARY OF THE INVENTION

The aim of the present invention is therefore to indicate a system, as well as a remote control device, that solves at least one of the above mentioned problems and/or at least improves the existing solutions.

These and other aims of the present invention are achieved by way of a system for controlling electronic devices by means of voice commands. In addition the present invention also relates to a remote control to control a plurality of electronic devices by means of voice commands.

In summary, the present invention relates to a system and/or a remote control for generating a plurality of output signals apt at controlling one or more electronic devices, characterized in that said remote control includes a sound transducer, a speech recognition unit for recognizing voice commands, a memory for storing information relative to available content of said one or more electronic devices and a control signal generator unit for generating control signals corresponding to said voice commands, for controlling said one or more electronic devices.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
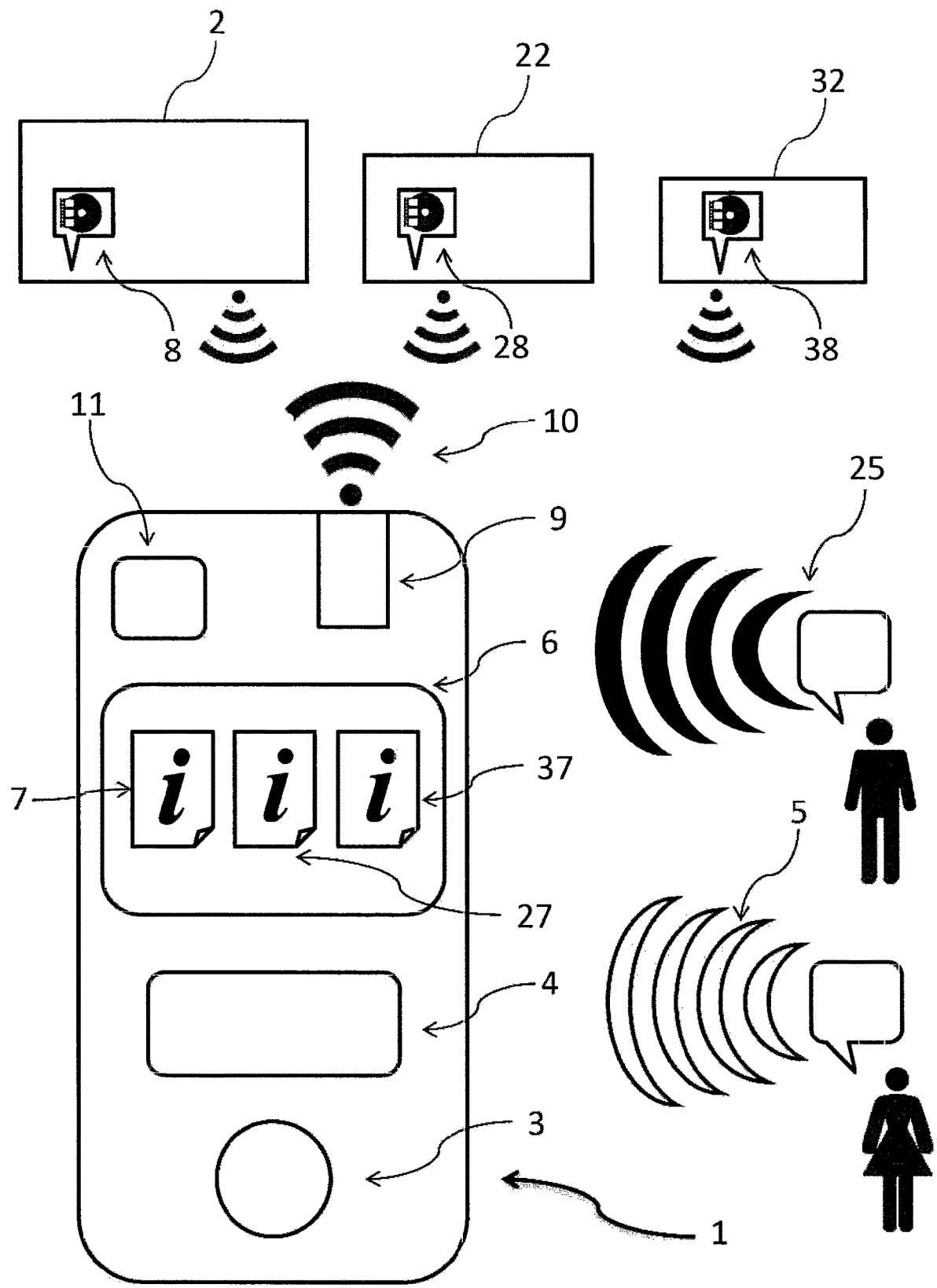
FIG. 1 schematically illustrates some of the features of a system and/or a remote control according to a plurality of advantageous embodiments of the present invention.

With reference to FIG. 1 some of the features are schematically illustrated according to a plurality of advantageous embodiments of the present invention comprising a remote control 1, wherein each of the features, or a combination of which, may present the subject matter of one single advantageous embodiment.

The remote control 1 comprises a sound transducer 3 for receiving a voice command 5, 25 and conveying it to a speech recognition unit 4 for further processing. It is clear that other processing units or methods, not illustrated in FIG. 1, can be deployed in order to process the voice command 5, 25 after receiving or before recognition of the same. The remote control 1 comprises a memory 6 wherein information 7, 27, 37 relative to available content 8, 28, 38 of electronic devices 2, 22, 32 is stored. The electronic devices 2, 22, 32 can be of different types, such as television sets, audio systems, set-top-boxes, blue-ray disc readers etc., and the available content 8, 28, 38 corresponds to said different types of electronic devices 2, 22, 32.

In accordance to a first embodiment of the present invention the information 7, 27, 37 relative to the available content 8, 28, 38 enables the remote control 1 to access the available content 8, 28, 38 depending on the received voice command 5 or 25 and to call up the available content 8, 28, 38 by generating a control signal 10 by way of a control signal generating and receiving unit 9 that in turn is also able to receive data from the electronic devices 2, 22, 32, in particular coming from the memory 6.

In accordance to a second embodiment of the present invention the remote control 1 periodically and automatically connects to the electronic devices 2, 22, 32 and downloads and updates the information 7, 27, 37 relative to the available content 8, 28, 38 in its memory 6. In this way the remote control 1 and the memory 6 know in every moment the updated available content 8, 28, 38 of the various electronic devices 2, 22, 32. Thanks to the fact that the memory 6 of the remote control 1 stores the updated information 7, 27, 37 of the available contents 8, 28, 38 of the electronic devices 2, 22, 32 whenever the user pronounces a voice command 5, 25 relative to available content 8, 28, 38 of an electronic device 2, 22, 32, that in such moment is in stand-by mode, knowing where the required content is located, the remote control 1 is able to switch on the relevant electronic device 2, 22, 32 where the required content 8, 28, 38 can be found. The information 7, 27, 37 consists of different data providing different information relative to the available content 8, 28, 38 such as name, length of time, source name, broadcaster, size, storage location, date of recording, type of data such as audio, video, photos and the like.

The information 7, 27, 37 can also be manually input by a user of the remote control 1 or by means of a receiver unit 11 for periodically and automatically retrieving such information 7, 27, 37 relative to the available content 8, 28, 38 while communicating with said electronic devices 2, 22, 32. Such different contents can be of any type and eventual events that could lead to a variation in the available content 8, 28, 38 and the corresponding information 7, 27, 37, such as turning on or off the devices 2, 22, 32, inserting or ejecting data medium, searching or tuning channels, receiving additional information from other sources such as EPG, Internet, media libraries and the like.

Therefore the present invention can be summarized by the fact that a system and/or a remote control 1 provides for generating output signals 10 apt at controlling one or more electronic devices 2,22,32, characterized in that said remote control 1 includes a sound transducer 3, a speech recognition unit 4 for recognizing voice commands 5,25, a memory 6 for storing information about the available content 8,28,38 of said one or more electronic devices 2,22,32 and a control signal generating and receiving unit 9 for generating control signals 10 corresponding to said voice commands 5,25, for controlling said one or more electronic devices 2,22,32.

The electronic device 2,22,32 may be a television set, HbbTV, smart TV, radio, audio system, CD player, DVD player, Blu-ray player, 3D Blu-ray player, set-top box, notebook, laptop, ultrabook, portable audio system, satellite receiver, stereo, hi-fi, media center or any other electronic device capable of delivering multimedia content and entertainment that can be controlled directly or indirectly by means of a remote control. The sound transducer 3 is a device or sensor capable of receiving sound, voice, speech or acoustic waves and transforming them into electronic signals, as occurs when the transducer 3 is suitable to be incorporated within a microphone or other acoustic sensor. The speech recognition unit 4 processes voice commands and recognizes a specific meaning of such voice command that corresponds to a control signal 10 which is generated by the remote control 1. The memory 6 used to store information about available content may be any type of memory unit such as RAM, DRAM, SDRAM, SSD or any other type of memory chip, memory module or the like. The memory 6 is adapted to store for instance the name of the services available on a television set or radio broadcasters, as well as the name of the programs available on said television services extracted from an EPG (Electronic Program Guide), the name of the tracks and/or artist available on a CD or DVD, the titles of movies, video, music and photos stored on the electronic devices, and the like. The memory 6 is generally adapted to store all the possible information 7,27, 37 that may be used by a user to specify and choose any type of data or content 8,28,38 in the controlled electronic devices 2,22,32. The control signal generating and receiving unit 9 generates an output signal 10 to control the electronic device 2,22,32. The output signal 10 generated depends on the recognized voice command 5,25. The remote control 1 can also be adapted to contain information 7,27,37 related to the operation of the electronic device 2,22,32 (such as tuning information, location of a certain track or address in the memory of stored media data) to assign to such voice commands 5,25 predefined models of operation and therefore obtaining from the received signals corresponding outputs. The aforementioned related information 7,27,37 is also adapted to be stored in the memory unit 6 or in an additional memory unit. The matching information 7,27,37 can be organized in a list or any other type of structure for managing information.

As a consequence of that mentioned herein above, the system and/or remote control 1 includes a receiving unit 11 to retrieve information 7,27,37 on the available contents 8,28,38 from at least one said memory unit contained in said at least one electronic device 2,22,32. Consequently, the receiving unit 11 is able to retrieve information 7,27,37 from at least one electronic device 2,22,32. The receiving unit 11 is an interface that enables communication with other electronic devices 2,22,32 for receiving information 7,27,37 about the available contents 8,28,38 such as services available on a television set or radio broadcasters, as well as the name of the programs available on said television services extracted from an EPG (Electronic Program Guide), the name of the tracks and/or artist available on a CD or DYD, the titles of movies, video, music and photos stored on the electronic devices, and the like. In general, any information 7,27,37 relating to the type of content 8,28,38, that can be played, streamed and/or stored in said one or more electronic devices 2,22,32, is able to be retrieved by the receiving unit 11. The receiving unit 11 can make use of any type of interface such as Bluetooth, infrared, wireless interface or the like.

Additionally the receiving unit 11 retrieves information from said electronic devices 2,22,32 and/or the Internet. Retrieving information from the Internet provides an advantageous possibility for gathering information relating to available content 8,28,38 on the basis of local and geographical criterion and having a list of broadcasters in a specific area, such as a country, city or region or of an EPG website.

Based on an advantageous aspect of the present invention the remote control 1 recognizes at least two different voice commands 5, 25, as a consequence of synonymous words, corresponding to one said control signal 10. This possibility enables the user to define several voice commands 5,25 to the same control signal 10 and available content respectively. In addition, it is possible to define several voice commands 5,25 by different users so as that each user is able to define a preferred voice command without being limited to unique voice commands, in order to solve the problem of synonymous commands, such as "increase volume of TV" and "turn up the volume of TV". Such operation allows for easily memorizing a voice command 5,25 on the one hand and enhances speech recognition by way of the speech recognition unit 4 on the other.

It is a further aspect of the present invention to manage and/or memorize said available content 8,28,38 based on different categories. Such categories may be for example audio, music tracks, video, television services and programs, movies, radio services or the like. In addition it is also advantageous to provide further categories and/or sub-categories such as artists, actors, video classification such as action, thriller, comedy, serial, sport, movie, news, reality, soap, documentary, audio classification such as R&B, hip-hop, pop, rock, recording time, location and the like.

Based on another further aspect of the present invention said remote control 1 provides multi-language speech recognition. The language settings further enhances speech recognition among other advantages of personalized usage of the remote control 1. For instance, the language settings may be performed through the menu facility the moment in which the general setting of the electronic device is carried out. In order to reduce costs to embody the remote control 1 according to the present invention, the software, for allowing the remote control multi-language speech recognition, can be downloaded from the electronic device 2,22, 32 through use of the Internet and uploaded to the remote control 1.

It is another aspect of the present invention to provide the user with feedback, such as audio, visual and/or sensory, the latter being an integral feature of the remote control 1. Such advantageous feature may be used for helping the user when for instance the remote control 1 informs the user of the necessity to repeat a voice command 5,25 due to it being unable to recognize such voice command 5,25. Moreover, whenever means are provided for a visual feedback, said feedback may also be used for providing the user with an overview of the categories, subcategories and available contents.

Another aspect of the present invention is that of providing a control signal 10 that comprises a group of control signals. This advantageous feature is used when a voice command 5,25 requires more than one control signal 10 to perform the desired voice command 5,25. For instance, when a user pronounces the name of a movie which is in a specific subcategory it is necessary to navigate through several categories to reach the subcategory in order to play the movie. In such a case the remote control 1 is able to automatically produce a group of control signals in order to assist the user. It is also possible to direct a group of control signals to more than one electronic device 2,22,32 when a single voice command 5,25 needs to be performed by at least two different electronic devices 2,22,32. For example when the voice command 5,25 is directed to select a service provided by a satellite receiver; it may be necessary to initially turn the satellite receiver on, to turn on the television set and then to select the desired service, all of which is accomplished by a group of control signals consisting of three control signals. In addition it is advantageous to generate a group of control signals directed at two different electronic devices 2,22,32 for controlling the electronic devices 2,22,32 interdependently. For instance, automatically turning off a hi-fi system or decreasing the volume when choosing a television service or a movie by way of a voice command.

Another advantageous aspect of the present invention provides for incorporating operational software in said electronic device 2,22,32 and said remote control 1. For example updating of the operational software can be performed by the manufacturer, or third parties, which is used by the remote control 1 to allow communication between the remote control 1 and the corresponding electronic device 2,22,32 thus improving communication and/or enhancing the overall controllability of the electronic device 2,22,32.

It is a further aspect of the present invention to propose a remote control 1 which automatically recognizes different users and provides personalized features. The recognition of the user can be achieved by way of user inputs such as voice, passwords or the like so as to provide personalized areas such as favorite categories, contents or even blocking contents that are considered unsuitable for specific users, such as children.

According to another aspect of the invention the remote control 1 comprises a display. The display may be used for providing visual feedback, thus improving and simplifying interaction for the user.

It is a further aspect of the present invention to propose a remote control 1 that is adapted to generate an on screen display function on said remote control 1 and/or on other electronic devices 2,22,32 having a display The aforementioned on screen display function has the aim of simplifying navigation while using a display such as a television screen or monitor or even when the on screen display function is directed to an electronic device 2,22,32 which normally has no display, such as a CD player or radio. The generated on screen display function of the remote control 1 is adapted to display information 7,27,37 relative to available content 8,28,38 of any electronic devices 2,22,32, such as an electronic device 2,22,32 comprising a master memory containing different types of multimedia content.

Figure 2:
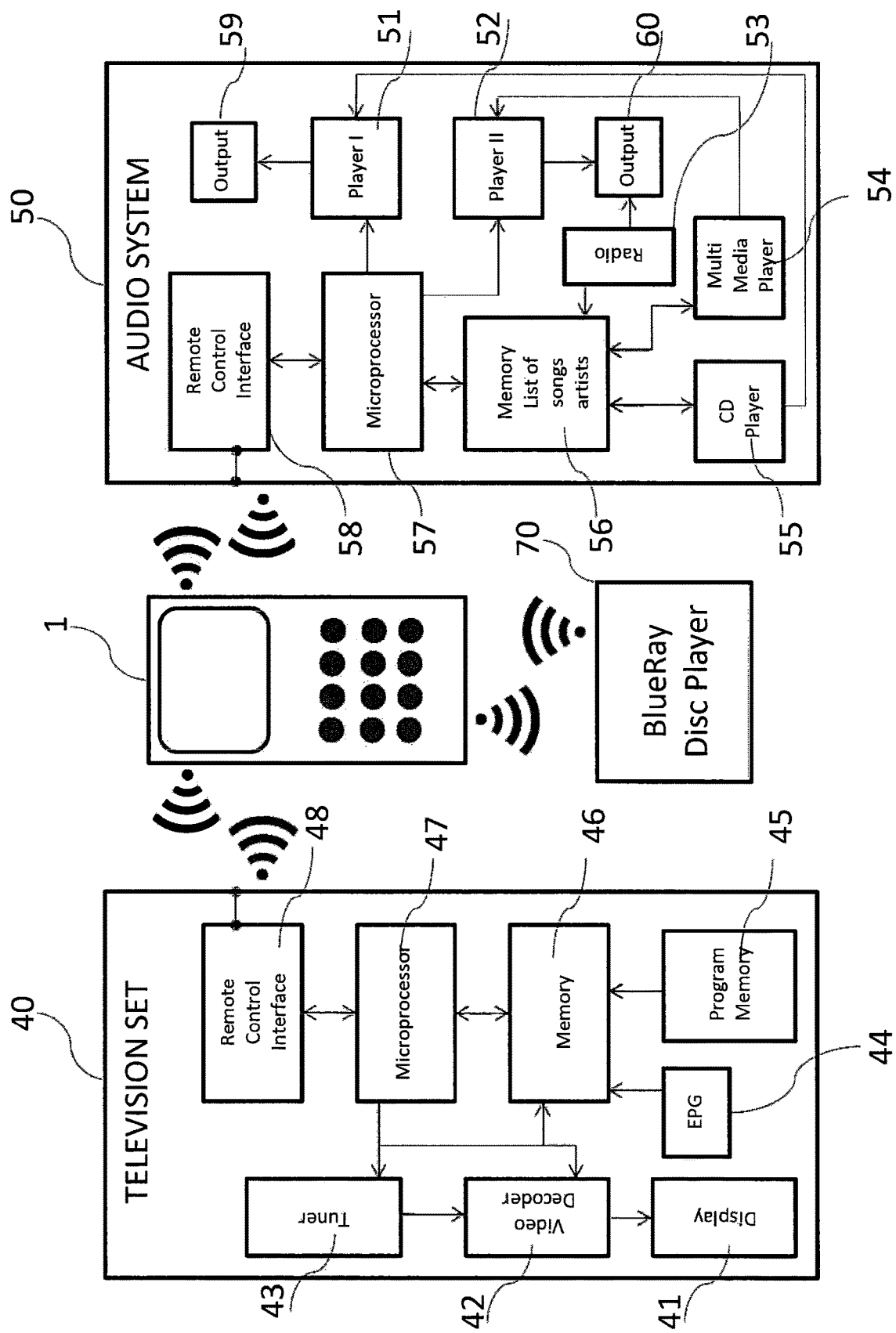
FIG. 2 illustrates some particular components of a system and/or a remote control for controlling a plurality of electronic devices to a plurality of advantageous embodiments of the present invention.

In FIG. 2 a system according to the present invention is illustrated wherein reference number 40 represents a television set (electronic device), connected to the remote control 1 byway of control signals 10. The system according to the present invention converts received voice commands (5, 25 in FIG. 1) by way of voice recognition means contained in said remote control 1 into said command signals 10. Said television set 40 comprises a remote control interface 48, making use of Bluetooth, infrared, wireless interface technology or the like, connected to a microprocessor 47 which in turn comprises a data acquisition unit for receiving and managing said control signals 10 from said remote control interface 48. The microprocessor 47 processes said control signals 10 then sends the processed signals to a memory unit 46. The microprocessor 47 also controls the functioning of a tuner 43 that in turn supplies television signals to a video decoder 42 also controlled by said microprocessor 47. Said television set 40 also comprises a display means for displaying the transmitted television signals received from said tuner 43 and decoded by said video decoder 42. An electronic program guide (EPG), containing a list of available and future broadcasted programs displayed in a chronological order, is connected by way of traditional means to said memory 46 for downloading its data into said memory 46 always under the control of said microprocessor 47, even if not illustrated in the figure. Reference number 45 represents a program memory, where information relative to television services are stored, that is also connected to said memory 46.

In order to periodically and automatically update the memory 6 of the remote control 1 with the contents relative to the memory 46 of the television set 40, the microprocessor 47 sends them to the remote control interface 48 for being in turn transmitted to the remote control 1 and stored in its memory 6. Therefore the communication between the television set 40 (electronic device) with the remote control 1 is truly bidirectional.

Similarly, reference number 50 represents an audio system (electronic device) connected to a remote control 1 byway of control signals 10. Said audio system comprises a remote control interface 58, making use of Bluetooth, infrared, wireless interface technology or the like, connected to a microprocessor 57 which comprises a data acquisition unit for receiving and managing said control signals 10. The microprocessor 57 processes said control signals 10, then sends the processed signals to a memory unit 56 containing, inter alias a list of songs, artists, etc., (as explained in the following). The microprocessor 57 is also connected to a player I and a player II in order to control their functioning and to receive from them data to be stored into said memory 56. Said players I and II may comprise external devices such as USB memory sticks, MP3 players, etc. Players I and II are in turn connected by way of traditional means to output sources 59, 60 (that may comprise amplifiers and loudspeakers). A CD player 55 is connected to said memory 56 as well as to said output source 59 by way of player I, likewise a multimedia device 54 is connected to said memory 56 and output source 60 by way of player II. A radio receiver 53, being part of the audio system 50, is also connected to said memory 56 as well as to said output source 60. It is clear that the functioning of said players I and II, said multimedia player 54, CD player 55, output sources 59 and 60, and the memory 56 is under the control of said microprocessor 57 even if the relevant connections are not illustrated in the figure.

In order to periodically and automatically update the memory 6 of the remote control 1 with the contents relative to the memory 56 of the audio system 50, the microprocessor 57 sends them to the remote control interface 58 for being in turn transmitted to the remote control 1 and stored in its memory 6. Therefore the communication between the audio system 50 (electronic device) with the remote control 1 is truly bidirectional.

According to the system of the present invention, further additional electronic devices can be remotely controlled by the same said remote control 1 controlling said television set 40 and said audio system 50, object of the present invention, such as for instance a Blu Ray player 70, schematically illustrated as an example.

Said system allows for a user or users to pronounce a wide variety of voice commands that not only enables the devices 40, 50, 70 to carry out traditional functions, such as program change, increase and/or decrease of volume, song selection, etc. but also enables vocal search facilities of the contents of said devices 40, 50, 70, such as "locate Pavarotti". In this example all contents (video, audio and photos) relative to said given vocal command "Pavarotti" may be displayed on the display unit of said remote control 1 and/or on the display means of the devices 40, 50, 70 for subsequent selection of the desired media.

In other cases of voice command, when there is a univocal relationship between the command and the function to be performed, such as "ARD TV" or "ZDF TV" (television services), the system understands that this command is relative to said television set 40 and controls the tuning of the same in order to change the tuning and display to said desired service, or if said television set 40 is in stand-by mode, it will provide for turning on the set and tuning the same to the desired service.

More in particular, if the voice command is of the following type "Tageschau/ARD" the system first of all will look into the data of the EPG 44 and in the case that the required program is being aired, the system will immediately provide for the display of the required program; in the case the desired program is not yet being aired, the system will provide for programming the tuning and display of it when it is aired. Eventually, another solution provides that in the event the user is viewing another program when the desired program becomes available, the system will show a prompt indicating that the desired program is now being aired, rather than automatically changing the program.

Recently television sets are equipped with a storage memory made of a hard disk, a flash memory or SSD memory and the like, where it is possible to record television contents or videos obtained through the Internet. Also in this case, information related to this recorded content, such as title, date of recording, author and the like can be stored in the memory 6 and made available to the remote control 1.

Similarly, when the voice command 5, 25 is of the type, such as "My Way Frank Sinatra", the system will identify said voice command as being relative to the audio system 50 and will provide for turning it on in the case it is off and select the desired song and reproduce it. Obviously, the same will apply to the BluRay disc player 70 in the case the voice command 5, 25 is of the type such as "The Godfather".

There are numerous possible variants to the system for controlling electronic devices 2,22,32 and 40, 50, 70 by means of voice commands 5,25, more specifically a single remote control 1 to control a plurality of electronic devices 2,22,32, and 40,50,70 by means of voice commands 5,25, without for this departing from the principles of novelty inherent in the inventive idea, as it is also clear that in its practical forms of implementation the illustrated details may be different, and the same may be replaced with technically equivalent elements.

For instance, the remote control 1 can be a implemented by way of a smart phone or tablet PC in which the dedicated software can downloaded in various ways, such as Internet, USB memory and the like.

Therefore it is easy to understand that the present invention is not limited to a system for controlling electronic devices 2,22,32, and 40,50,70 by means of voice commands 5,25, more specifically a remote control 1 to control a plurality of electronic devices 2,22,32,40,50,70 by means of voice commands 5,25, but is subject to various modifications, improvements and being substituted with equivalent parts and elements without however departing from the inventive idea, as is better defined in the following claims.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claim.

The invention claimed is:

1. A remote control for generating output signals apt for controlling at least two electronic devices, said remote control comprising:
   a sound transducer;
   a speech recognition unit configured to recognize voice commands;
   a memory configured to store information relative to available content of said at least two electronic devices;
   a control signal generating and receiving unit configured to generate control signals corresponding to said voice commands, for controlling said at least two electronic devices;
   a receiving unit configured to retrieve from the at least two electronic devices information relative to available content saved on the at least two electronic devices for storing in said memory; and
   a display unit;
   wherein said remote control, as a consequence of a certain voice command, is configured to locate in its memory where the content relative to said certain voice command are stored in said at least two electronic devices,
   wherein said control signals comprise a group of control signals that are addressed to the at least two electronic devices for controlling the at least two electronic devices interdependently and wherein said remote control is configured to automatically produce said group of control signals, and wherein said remote control is configured to direct the group of control signals to the at least two electronic devices based on a single voice command, such that the control signals are performed by the at least two different electronic devices according to the single voice command.

2. The remote control according to claim 1;
wherein said receiving unit is configured to retrieve information from said electronic devices and/or from the Internet where information is available in relation to contents or programs for said electronic devices.

3. The remote control according to claim 1;
wherein said remote control is configured to recognize at least two different voice commands for generating the same control signal.

4. The remote control accordingly to claim 1;
wherein said remote control is configured to manage and/or store said information relative to available content that are divided into different categories.

5. The remote control according to claim 1;
wherein said remote control is configured to recognize speech in multiple languages.

6. The remote control according to claim 1;
wherein the remote control is configured to download a software, said electronic device through use of the Internet and transmitted to said control signal generating and receiving unit that configures the remote control to recognize speech in multiple languages.

7. The remote control according to claim 1;
wherein said remote control is configured to give feedback to a user as a consequence of an unrecognized voice command.

8. The remote control according to claim 7;
wherein said feedback is audio, visual, sensory, or a combination thereof.

9. The remote control according to claim 1;
wherein said remote control and said device are configured to incorporate operational software that is updated for improving communication and controllability of the same.

10. The remote control according to claim 1;
wherein said remote control is configured to automatically recognize different users by providing personalized features.

11. The remote control according to claim 10;
wherein said remote control is configured to generate an on screen display feature on said remote control and/or on a display of the at least two electronic devices.

12. The remote control according to claim 1;
wherein said remote control is configured to periodically and automatically connect to said at least on electronic device, and download and update the information relative to said available content in said memory.

13. The remote control according to claim 1;
wherein, in a case that the contents required by the user through a voice command is contained in the at least two electronic devices that is momentarily in a stand-by mode, said remote control is configured to turn on said at least two electronic devices.

14. The remote control according claim 1;
wherein said electronic device is configured to connect to Internet for gathering information relating to the available content programs, or a combination thereof, on the basis of local and geographical criterion or of an EPG website.

15. The remote control according to claim 1;
wherein said remote control is configured to direct a group of control signals to more than two electronic devices when a single voice command needs to be performed by at least two different electronic devices.

16. The remote control according to claim 12;
wherein, in order to periodically and automatically update said memory with the contents contained in said electronic devices, said control signal generating and receiving unit is configured to receive, from a corresponding remote control interface contained in said electronic devices, information transmitted to said remote control.

17. The remote control according to claim 1;
wherein, as a consequence of a certain voice command when there is a univocal relationship between the command and the function to be performed, said remote control is configured to correlate that said command is relative to a certain electronic device and;
instructs the certain electronic device to perform said desired function; or
if said electronic device is in stand-by mode, instructs the device to turn on and perform the desired function.

18. The system of claim 1, wherein said at least two electronic devices are selected from the group consisting of television sets, radios, CD players, disc players, set-top boxes, personal computers, and media centers.

19. The System according to claim 1;
wherein said at least two electronic device each comprises:
remote control interface configured to bidirectionally exchange information between said remote control and said at least two electronic devices.

20. The system according to claim 1; wherein said at least two electronic devices comprises: an internal memory where all the available contents and/or programs related to the at least two electronic devices are stored and updated during the functioning of said at least two electronic devices.

21. The system according to claim 20;
wherein said at least two electronic devices comprises:
a remote control interface configured to bidirectionally exchange information between said remote control and said at least two electronic devices; and
wherein the system is configured to periodically and automatically transferred the contents of said internal memory of the at least two electronic devices to said memory of said remote control through said control signal generating and receiving unit and said remote control interface.

22. The remote control according to claim 1;
wherein the remote control is a smart phone or a tablet PC.

* * * * *